US 6,655,838 B2

(12) United States Patent
Perrone, Jr.

(10) Patent No.: US 6,655,838 B2
(45) Date of Patent: Dec. 2, 2003

(54) SHUTTLE COMPENSATED HYDROSTATIC BEARING

(76) Inventor: Jerome Frank Perrone, Jr., 283 N. Ave., Rochester, MA (US) 02770

( * ) Notice: Subject to any disclaimer, the term of this patent is extended or adjusted under 35 U.S.C. 154(b) by 0 days.

(21) Appl. No.: 10/198,979

(22) Filed: Jul. 19, 2002

(65) Prior Publication Data

US 2002/0181807 A1 Dec. 5, 2002

Related U.S. Application Data

(62) Division of application No. 09/506,042, filed on Feb. 17, 2000, now Pat. No. 6,474,867.

(51) Int. Cl.[7] ............................................... F16C 32/06
(52) U.S. Cl. ......................................................... 384/12
(58) Field of Search ............................ 384/12, 99, 121, 384/114, 118

(56) References Cited

U.S. PATENT DOCUMENTS 4,099,802 A * 7/1978 Heinemann et al. ........ 384/122

* cited by examiner

Primary Examiner—Lenard A Footland

(57) ABSTRACT

Apparatus for allowing nearly frictionless relative motion between bearing elements in prescribed directions while providing high stiffness against motion in other directions has a bearing guide with one or more bearing guide surfaces. A bearing carriage with one or more bearing lands is constructed and located so that the bearing lands are parallel to, in proximity to, and oppose the smooth surfaces of the bearing guide. The assembly of bearing carriage to bearing guide allows the bearing carriage to traverse along the length of, or rotate about the bearing guide while preserving the nominal bearing gap between bearing land and bearing guide surfaces. The bearing carriage has a number of recesses or bearing pockets, which oppose the bearing guide surfaces and are hydraulically connected to a shuttle body, which has an internal cavity which houses a shuttle. The shuttle is exposed to pressurized fluid flow entering the cavity and acts to divide the outlet flow to each bearing pocket depending on the location of the shuttle within the shuttle body. If the bearing carriage or bearing guide are subject to a relative force which affects the bearing gap between bearing land and bearing guide surface the resulting pressure differential across the shuttle will displace the shuttle thereby reducing flow and pressure to the bearing gap of increased dimension thereby restoring the nominal bearing gap.

17 Claims, 6 Drawing Sheets

SHUTTLE COMPENSATED HYDROSTATIC BEARING

CROSS-REFERENCE TO RELATED APPLICATIONS

This is a division of Ser. No. 09/506,042, Filed on Feb. 17, 2000, now U.S. Pat. No. 6,474,867.

BACKGROUND

1. Field of Invention

This invention relates to bearings that provide restraint of bearing elements such that translation and rotation between the bearing elements in directions substantially perpendicular to opposing bearing lands is permitted, commonly know as self-compensating hydrostatic bearings. The distance or bearing gap between a bearing land and opposing bearing guide surface is made nearly consistent and frictionless during motion in the allowed directions by a pressure or flow modulated fluid medium that occupies the bearing gap. The pressure of the fluid medium is varied relative to the instantaneous load on the bearing and resulting change in bearing gap so that a restoring force arises of sufficient magnitude to displace the bearing elements and restore the equilibrium bearing gap width. The invention specifically relates to an improved self-compensating hydrostatic bearing system.

2. Description of Prior Art

Self-compensating hydrostatic bearing designs as described in the prior art of U.S. Pat. Nos. 3,582,159 5,010,794 5,104,237 5,281,032 5,484,208 5,513,917 5,971,614 and 5,980,110 call for a flow restrictor or modulator to be located in a bearing carriage at the bearing land comprised of an elaborate arrangement of groves, holes and or annuluses. These features must be exact in location, position, dimension and surface finish for proper performance.

The bearing land adjacent to the flow restrictor is in proximity of, and opposed by, an adjacent surface on a rail or spindle within a mechanical assembly. In order for the flow restrictor to function, the nominal bearing gap as controlled dimensionally by the adjoining mechanical assembly, must be established to an accuracy of within thousands of an inch. This means that the components of the mechanical assembly must be machined to high accuracy and at great cost.

In most applications of hydrostatic bearings, two or more bearing lands having an integral pocket and restrictor will each oppose a different surface of a common mechanical element, spindle or rail. As a result, the flow modulator or restrictor located in each bearing carriage is nested within an assembly such that creating the proper nominal bearing gap at each bearing land requires high accuracy of construction between each bearing land, as well as between each utilized surface on the common bearing element, rail or spindle.

The flow restrictor is subject to fluid flow and has intricate shape and contours that render it very susceptible to clogging with impurities. In prior art, the flow restrictor is an integral part of the bearing carriage. Once the flow restrictor becomes clogged, the bearing design of prior art does not allow for ease of cleaning or replacement.

Prior art provides for bearings to operate in conjunctive pairs such that the regulating of delivery fluid flow and pressure to the bearing pocket in the bearing carriage is provided by the flow restrictor located in the second bearing carriage. The same relative relationship exists for the bearing pocket of the second bearing carriage and the restrictor of the first bearing carriage. In order for a bearing pair to bring rise to the proper restoring forces at each bearing pocket, great accuracy must be provided between the relative location of the bearing land adjacent to the bearing pocket and the bearing land adjacent to the restrictor in the bearing carriage as well as in the conjunctive bearing carriage.

The prior art requires that the flow restrictor reside in the bearing carriage. This imposes that the bearing carriage and the land be of sufficient size to contain both the bearing pocket and the flow restrictor.

Since the flow restrictor and bearing pocket are located in the bearing carriage of the prior art, very complex internal cross porting is utilized in order to create the required hydraulic communication between the pocket and the restrictor within the bearing carriage. The interconnecting porting must be machined into the bearing, as external piping is not possible. This construction makes for expensive manufacturing operations and bearing carriage parts that are not serviceable.

In the prior art, the individual flow restrictor is used to regulate the fluid provided to each bearing pocket. As a result each flow restrictor is provided with pressurized fluid from a remote or separate source. In order for the relative outputs of the flow restrictors to be correct, the relative difference in the remote or separate fluid sources must be minimized.

In the prior art of U.S. Pat. No. 5,064,297 a metal plate spring diaphragm controls flow by alternately deflecting and seating against adjacent throttling control valves. The plate spring diaphragm deflects according to the applied differential pressure. Since work must be done on the diaphragm by the differential fluid in order to deflect the diaphragm the response time of the diaphragm is increased. This delay in response time means reduces the accuracy of the bearing position.

In the prior art of U.S. Pat. No. 5,064,297 the deflection of the metal spring plate diaphragm brings about restoring forces that oppose the net force of the applied differential pressure. This condition can give rise to resonance and resulting inaccuracies of the bearing.

In the prior art of U.S. Pat. No. 5,064,297 large differential pressures can seat the diaphragm on one throttling valve. If this occurs the effective area which fluid pressure is applied is smaller on the side that lies against the throttling valve. The diaphragms position is fixed and fails to regulate fluid flow or bearing position.

OBJECTS AND ADVANTAGES

Accordingly, several objects or advantages of the Shuttle Compensated Hydrostatic Bearing over hydrostatic bearings of prior art are as follows;

The Shuttle Compensated Hydrostatic Bearing includes a flow regulating valve or shuttle valve comprised of a shuttle and shuttle body which need not be integrated into a mating bearing surface but need only be connected by a fluid path. This means that the invention is more economical to manufacture because the prior art requires a precision flow restrictor consisting of a dimensionally precise combination of annuluses, holes and or slots machined into a bearing carriage with particular locational accuracy with respect to an opposing surface.

The shuttle valve of the current invention is a modular component whose function is dependent on hydraulic feedback and not position or relative location to an opposing rail surface or spindle surface. In the absence of these manufacturing constraints, the invention can be manufactured with great accuracy and low cost.

The invention compares fluid conditions of flow and pressure within the bearing gaps of pairs of bearings without dependence on the distance between the bearing lands of each bearing or respective rail surface or spindle surfaces. This feature of the invention allows for machining tolerances to be reduced within the assembly while providing a high positional accuracy and stiffness. The separable and modular configuration of the shuttle valve allows for ease of cleaning or replacement in case of clogging or the inadvertent introduction of contaminants. The bearing pockets in a bearing carriage of the invention hydraulically communicate with a shuttle valve instead of a restrictor mounted in a different bearing carriage. This configuration eliminates the need for strict dimensional relationship between restrictors as in prior art. The bearing carriage in the invention does not house the shuttle valve so that the length of the bearing carriage can be less than that of the prior art.

The shuttle valve is connected to the bearing carriage hydraulically without being located or embedded in the bearing land, as is typically the case in the prior art with the flow restrictor. This allows for a simplified hydraulic connection between the shuttle valve and the bearing carriage to be constructed of external tube or piping instead of elaborate internal cross-porting which is difficult and expensive to manufacture.

The shuttle valve of the current invention can provide pressure regulated fluid to a pair of bearing gaps while dividing the flow from a single source. This eliminates the need to maintain like inlet port pressure levels among separate fluid supplies and eliminates this as a source of error in the output pressures to the bearing gaps.

The shuttle of the current invention is not mechanically attached to the shuttle body. The position and performance of the shuttle is directly affected by only the applied differential fluid pressure. Since the movement of the shuttle is not encumbered by any mechanical restraint, the response time or lag of the shuttle to the instantaneous differential fluid pressure is minimized. As a result the positional accuracy of the bearing is kept high.

The shuttle of the current invention does not experience a mechanically induce restoring force when displaced from an equilibrium position. This means that a resonance or vibration of the shuttle due to opposing mechanical and hydraulic forces cannot exist. Therefore the current invention will not become unstable due to self-induced vibration.

At times of extreme fluid pressure differentials across the shuttle, the shuttle may seat against the shuttle body. In this condition a small area of the shuttle surface is prevented from exposure to the fluid pressure within the shuttle body. At the same time the reduced flow to the outlet port gives rise to a higher pressure than that of the fluid escaping more rapidly at the opposite outlet port. Thus the current invention allows that a higher pressure is applied to a substantially equal surface area on the shuttle enabling the shuttle to prevent sealing completely and stalling the shuttle valve causing the affected bearing gap to collapse.

Further objects and advantages of the Shuttle Compensated Hydrostatic Bearing will become apparent from consideration of the drawings and ensuing description.

DRAWING FIGURES

The features of the invention believed to be novel and the elements characteristic of the invention are set forth with particularity in the appended claims. The figures are for illustration purposes only and are not drawn to scale.

Figure 1:
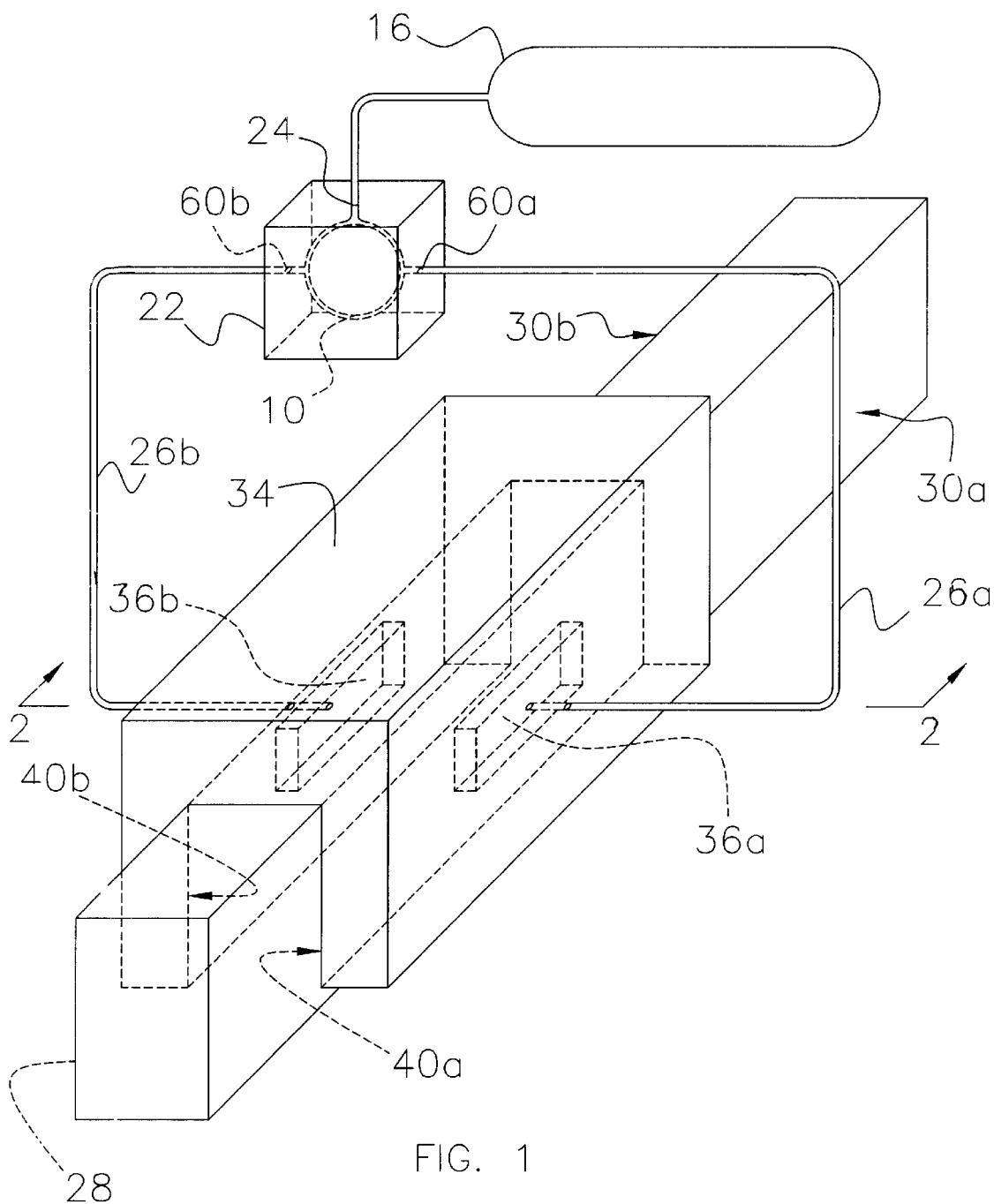
FIG. 1 is an isometric view of the preferred embodiment of the invention with a rail and ball shuttle.

REFERENCE NUMERALS IN DRAWINGS 10. ball shuttle
12. disc shuttle
14. dumbbell shuttle
16. fluid pressure source
18. disc shuttle body
20. dumbbell shuttle body
22. ball shuttle body
24. inlet port
26a. hydraulic communication
26b. hydraulic communication
28. rail
30a. rail surface
30b. rail surface
34. linear bearing carriage
36a. linear bearing pocket
36b. linear bearing pocket
40a. linear bearing land
40b. linear bearing land
44. spindle
46. spindle surface
48. radial bearing carriage
50a. radial bearing pocket
50b. radial bearing pocket
54a. radial bearing land
54b. radial bearing land
60a. outlet port
60b. outlet port

SUMMARY

An apparatus which allows for nearly frictionless motion between bearing elements in a given direction or directions while providing stiffness to prevent or restrain motion in other relative directions.

DESCRIPTION OF PREFERRED EMBODIMENT OF INVENTION

Figure 2:
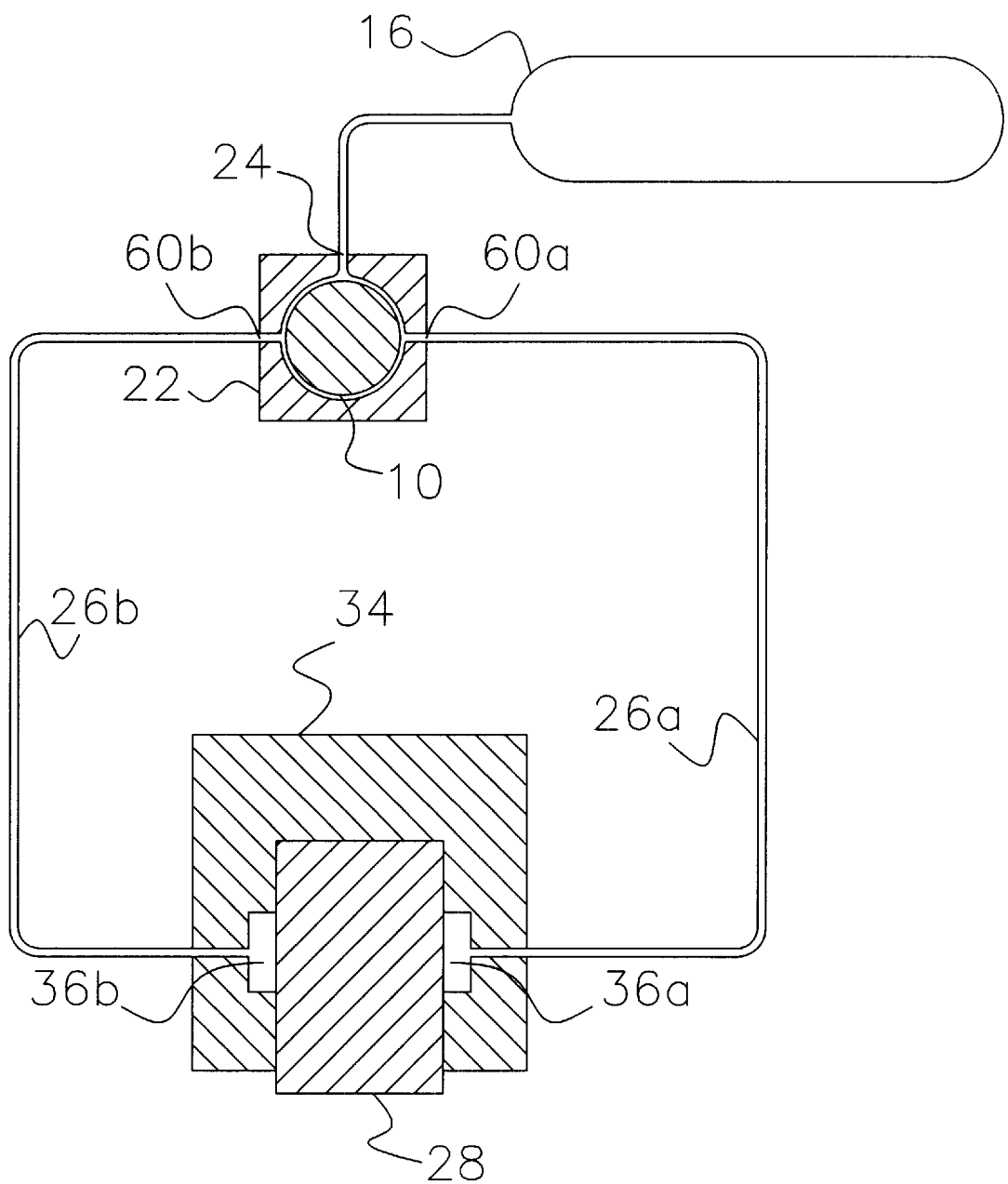
FIG. 2 is a section view of the preferred embodiment of the invention.

FIG. 1 is an isometric view of a typical Shuttle Compensated Hydrostatic Bearing with a bearing guide, such as a rail 28 and a shuttle, such as a ball shuttle 10. Ball shuttle 10 is substantially spherical. A bearing carriage, such as a linear bearing carriage 34 has bearing lands, such as a linear bearing land 40a and a linear bearing land 40b. Linear bearing land 40a and linear bearing land 40b oppose each other. A bearing pocket, such as a linear bearing pocket 36a is located in linear bearing land 40a, while a linear bearing pocket 36b is located in linear bearing land 40b. Rail 28 is located between linear bearing land 40a and linear bearing land 40b. Linear bearing carriage 34 is free to traverse along the length of rail 28. Rail 28 has bearing guide surfaces, such as a rail surface 30a and rail surface 30b along its length. Rail surface 30a and rail surface 30b are parallel to and in close proximity of linear bearing land 40a and linear bearing land 40b respectively. Hydraulic communication 26a and 26b is provided between linear bearing pocket 36a, linear bearing pocket 36b and a shuttle body, such as ball shuttle body 22. FIG. 2 is a section view of the preferred embodiment of the invention. Ball shuttle body 22 has an internal void to which outlet ports 60a and 60b are connected and hydraulic communications 26a and 26b are made. A ball shuttle 10 is located within the void. Ball shuttle 10 is sized to allow for movement within ball shuttle body 22. A fluid pressure source 16 is connected to an inlet port 24 in ball shuttle body 22. Inlet port 24 is ported to the internal void and located to establish parallel hydraulic flow paths between inlet port 24 to hydraulic communications 26a and 26b. Ball shuttle 10 is exposed to the divided fluid comprising the parallel flow paths. Ball shuttle 10 and the void in ball shuttle body 22 are of size and shape to create a hydraulic restriction in both of the parallel flow paths. The magnitude of hydraulic resistance in each flow path is made increasingly higher as ball shuttle 10 moves toward the interior surface of the shuttle body which bounds the respective flow path. Conversely, as ball shuttle 10 moves away from the interior surface of the shuttle body, which bounds the respective flow path, the hydraulic resistance is lowered.

Figure 3:
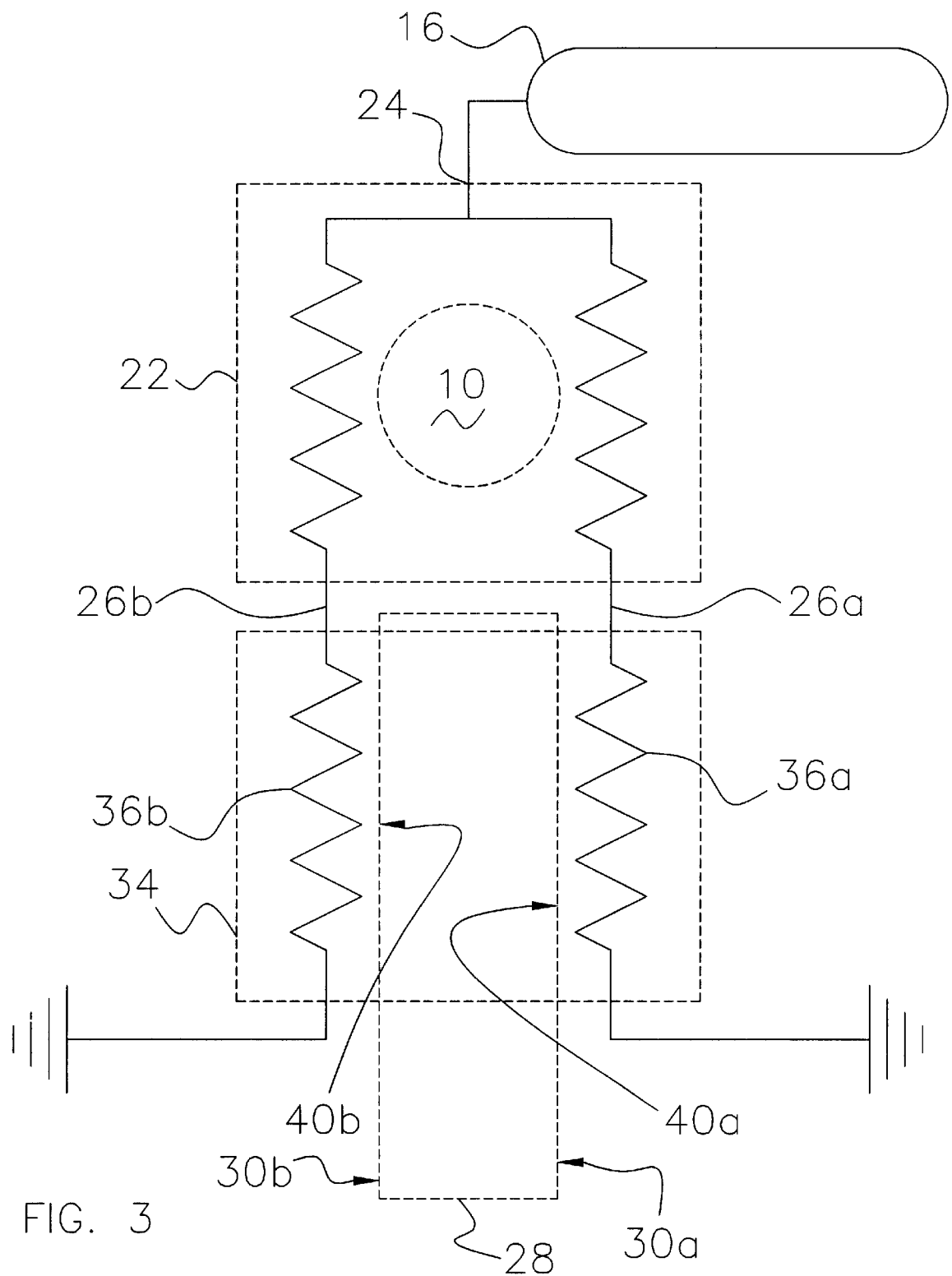
FIG. 3 is a hydraulic schematic of the preferred embodiment of the invention.

Operation of Preferred Embodiment of Invention:

FIG. 3 is a hydraulic schematic of the preferred embodiment of the invention. Fluid from a pressurized fluid source 16 enters ball shuttle body 22 at inlet port 24 and envelops ball shuttle 10. The fluid flow divides in proportions relative to the hydraulic resistance between ball shuttle 10 and ball shuttle body 22 and exits ball shuttle body 22. Hydraulic communications 26a and 26b convey the pressurized fluid into linear bearing pocket 36a and linear bearing pocket 36b. From linear bearing pocket 36a, the fluid is forced into the bearing gap between linear bearing land 40a and rail surface 30a. From linear bearing pocket 36b, the fluid is forced into the bearing gap between linear bearing land 40b and rail surface 30b. The bearing gaps offer hydraulic resistance to the fluid flow. The fluid pressure within linear bearing pocket 36a and linear bearing pocket 36b is dependent on the magnitude of the respective inlet fluid pressure and the hydraulic resistance offered by the bearing gaps. Rail 28 will shift relative to linear bearing carriage 34 as an external load is applied directly or indirectly. As a result the bearing gap between linear bearing land 40a and rail surface 30a will increase and the bearing gap between linear bearing land 40b and rail surface 30b will decrease or vice versa. As the bearing gap increases, the subsequent hydraulic resistance decreases allowing fluid to escape from linear bearing pocket 36a more quickly and at a lower pocket fluid pressure. Conversely, as the bearing gap diminishes at linear bearing pocket 36b, hydraulic resistance increases resulting in the containment of fluid at a higher pressure within linear bearing pocket 36b. Hydraulic communications 26a and 26b convey the decreased linear bearing pocket 36a pressure and increase linear bearing pocket 36b pressure to the respective parallel fluid paths within ball shuttle body 22. This rise in differential pressure across ball shuttle 10 drives ball shuttle 10 in the direction of the flow path of lower pressure. This movement is accompanied by an increase in hydraulic resistance between ball shuttle 10 and ball shuttle body 22 in the flow path of lower pressure and a subsequent decrease in flow rate and pressure being delivered to linear bearing pocket 36a of greater bearing gap. Simultaneously, the flow path of higher pressure within ball shuttle body 22 experiences a decrease in hydraulic resistance between ball shuttle 10 and ball shuttle body 22 giving rise to increased flow rate and delivery pressure to linear bearing pocket 36b of lesser bearing gap. The resultant rise in differential pressure between linear bearing pocket 36a and linear bearing pocket 36b create a restoring force which will act to displace rail 28 relative to linear bearing carriage 34 in a manner that will restore equal or nominal bearing gaps. As the bearing gaps are equalized, the magnitude of hydraulic resistance offered by each will return to the nominal value. This equilibrium condition is conveyed to ball shuttle body 22 by way of hydraulic communication 26a and 26b. The pressure differential across ball shuttle 10 ceases and ball shuttle 10 shifts back to its equilibrium position. The consistent fluid gap allows for nearly frictionless motion between the linear bearing carriage 34 and rail 28 in directions parallel to rail surface 30a and rail surface 30b, while providing high stiffness in a direction normal to the rail surfaces 30a and 30b.

Figure 4:
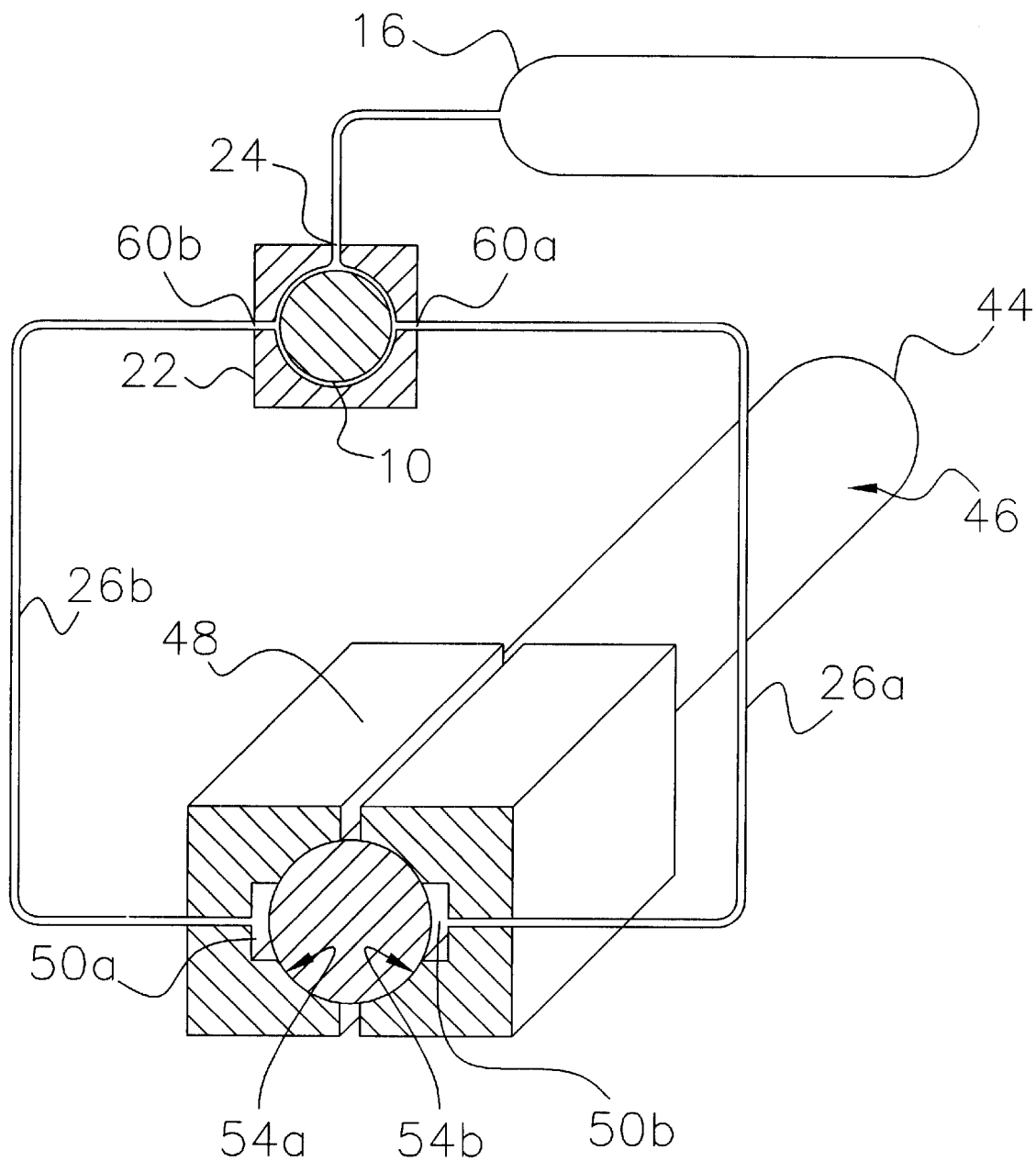
FIG. 4 is a section view of an alternative embodiment of the invention as a rotary bearing with a spindle and ball shuttle.

Description of Alternate Embodiment of Invention as a Rotary Bearing with a Spindle and Ball Shuttle:

FIG. 4 is a section view of an alternative embodiment of the invention where a bearing carriage, such as a radial bearing carriage 48 is used in place of linear bearing carriage 34 of the preferred embodiment. The bearing carriage 48 has a bearing land, such as a radial bearing land 54a and radial bearing land 54b. A plurality bearing pockets, such as a radial bearing pocket 50a and radial bearing pocket 50b are located in radial bearing land 54a and radial bearing land 54b respectively. The alternative embodiment of the invention has a bearing guide, such as a spindle 44 in place of a rail 28 of the preferred embodiment. Spindle 44 has a bearing guide surface, such as a spindle surface 46 located on the circumference of spindle 44. Spindle 44 is located within radial bearing land 54a and radial bearing land 54b. Spindle 44 can rotate in radial bearing carriage 48. Spindle surfaces 46 are concentric to and in close proximity of radial bearing land 54a and radial bearing land 54b.

Operation of Alternate Embodiment of Invention as a Rotary Bearing with a Spindle and Ball Shuttle:

FIG. 4 is a section view of an alternative embodiment of the invention as a rotary bearing with a spindle 44 and ball shuttle 10. Fluid from a pressurized fluid source 16 enters ball shuttle body 22 at inlet port 24 and envelops ball shuttle 10. The fluid flow divides in proportions relative to the hydraulic resistance between ball shuttle 10 and ball shuttle body 22 and exits ball shuttle body 22. Hydraulic communications 26a and 26b convey the pressurized fluid into radial bearing pocket 50a and radial bearing pocket 50b. From radial bearing pocket 50a, the fluid is forced into the adjacent bearing gap between radial bearing land 54a and spindle surface 46. From radial bearing pocket 50b, the fluid is forced into the adjacent bearing gap between radial bearing land 54b and spindle surface 46. The bearing gaps offer hydraulic resistance to the fluid flow. The fluid pressure within radial bearing pocket 50a and radial bearing pocket 50b is dependent on the magnitude of the respective inlet fluid pressure and the hydraulic resistance offered by the bearing gaps. Spindle 44 will shift relative to radial bearing carriage 48 as an external load is applied directly or indirectly. As a result the bearing gap between radial bearing land 54a and spindle surface 46 adjacent to radial bearing pocket 50a will increase while the bearing gap between radial bearing land 54b and spindle surface 46 adjacent to radial bearing pocket 50b will decrease or vice versa. As the bearing gap increases, the subsequent hydraulic resistance decreases allowing fluid to escape from radial bearing pocket 50*a* more quickly and at a lower pocket fluid pressure. Conversely, as the bearing gap diminishes, at radial bearing pocket 50*b*, hydraulic resistance increases resulting in the containment of fluid at a higher pressure within radial bearing pocket 50*b*. Hydraulic communications 26*a* and 26*b* convey the increase in pressure at radial bearing pocket 50*a* and decrease in pressure at radial bearing pocket 50*b* to each of the respective parallel fluid paths within ball shuttle body 22. This rise in differential pressure across ball shuttle 10 drives ball shuttle 10 in the direction of the flow path of lower pressure. This movement is accompanied by an increase in hydraulic resistance between ball shuttle 10 and ball shuttle body 22 in the flow path of lower pressure and a subsequent decrease in flow rate and pressure being delivered to radial bearing pocket 50*a* of greater bearing gap. Simultaneously, the flow path of higher pressure within ball shuttle body 22 experiences a decrease in hydraulic resistance between ball shuttle 10 and ball shuttle body 22 giving rise to increased flow rate and delivery pressure to radial bearing pocket 50*b* of lesser bearing gap. The resultant rise in differential pressure between radial bearing pocket 50*a* and radial bearing pocket 50*b* create a restoring force which will act to displace spindle 44 relative to radial bearing carriage 48 in a manner that will restore equal or nominal bearing gaps. As the bearing gaps are equalized, the magnitude of hydraulic resistance offered by each will return to the nominal value. This equilibrium condition is conveyed to ball shuttle body 22 by way of hydraulic communication 26*a* and 26*b*. The pressure differential across ball shuttle 10 ceases and ball shuttle 10 shifts back to its equilibrium position. The consistent fluid bearing gap allows for nearly frictionless motion between the radial bearing carriage 48 and spindle 44 in directions tangent to the spindle surface 46, while providing high stiffness in a direction normal to spindle surface 46.

Figure 5:
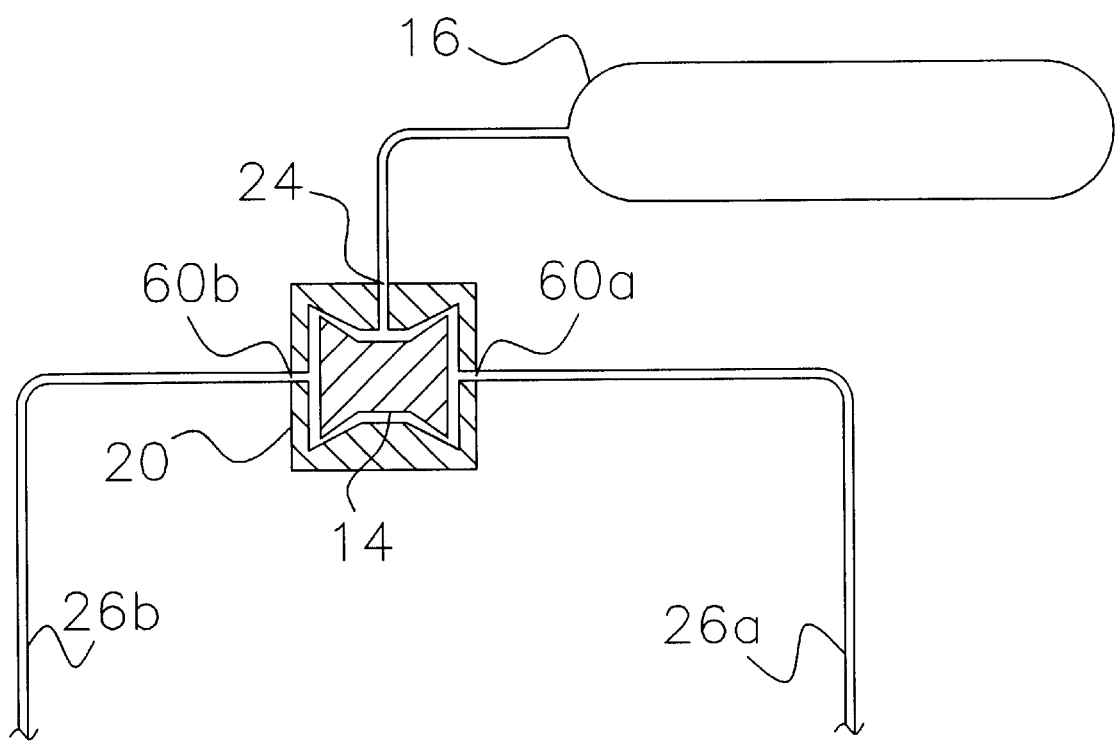
FIG. 5 is a section view of an alternative embodiment of the shuttle as a dumbbell shuttle.

Description of Alternate Embodiment of Invention with a Dumbbell Shuttle:

FIG. 5 is a section view of an alternative embodiment of the shuttle, such as a dumbbell shuttle 14 in place of a ball shuttle 10 of the preferred embodiment. Dumbbell shuttle 14 has two identical surfaces that are curved or conical, concentric and face toward each other. A shuttle body, such as a dumbbell shuttle body 20 has an internal void to which outlet ports 60*a* and 60*b* are connected and hydraulic communications 26*a* and 26*b* are made. Dumbbell shuttle 14 is located within the void. Dumbbell shuttle 14 is sized to allow for movement within dumbbell shuttle body 20. A fluid pressure source 16 is connected to an inlet port 24 in dumbbell shuttle body 20. Inlet port 24 is ported to the internal void and located to establish parallel hydraulic flow paths between inlet port 24 to hydraulic communications 26*a* and 26*b*. Dumbbell shuttle 14 is exposed to the divided fluid comprising the parallel flow paths. dumbbell shuttle 14 and the void in dumbbell shuttle body 20 are of size and shape to create a hydraulic restriction in both of the parallel flow paths. The magnitude of the hydraulic resistance in each flow path is made increasingly higher as dumbbell shuttle 14 moves toward the interior surface of the dumbbell shuttle body 20 which bounds the respective flow path. Conversely, as dumbbell shuttle 14 moves away from the interior surface of the dumbbell shuttle body 20, which bounds the respective flow path, the hydraulic resistance is lowered.

Operation of Alternate Embodiment of Invention with a Dumbbell Shuttle:

FIG. 5 is a section view of an alternative embodiment of the invention with a dumbbell shuttle 14. Fluid from a pressurized fluid source 16 enters dumbbell shuttle body 20 at inlet port 24 and envelops dumbbell shuttle 14. The fluid flow divides in proportions relative to the hydraulic resistance between dumbbell shuttle 14 and dumbbell shuttle body 20 and is conveyed to the bearing pockets 36*a* and 36*b* or 50*a* and 50*b* via hydraulic communication 26*a* and 26*b*. Accordingly changes in the differential pressure of bearing pocket 36*a* and 36*b* or 50*a* and 50*b* is communicated across dumbbell shuttle 14 which drives dumbbell shuttle 14 in the direction of the flow path of lower pressure. This movement is accompanied by an increase in hydraulic resistance between dumbbell shuttle 14 and dumbbell shuttle body 20 in the flow path of lower pressure and a subsequent decrease in flow rate and pressure being delivered to a bearing pocket 36*a* or 36*b* or 50*a* and 50*b* of greater bearing gap. Simultaneously, the flow path of higher pressure within dumbbell shuttle body 20 experiences a decrease in hydraulic resistance between dumbbell shuttle 14 and dumbbell shuttle body 20 giving rise to increased flow rate and delivery pressure a bearing pocket 36*a* or 36*b* or 50*a* or 50*b* of lesser bearing gap. The resultant rise in differential pressure between bearing pockets 36*a* and 36*b* or 50*a* and 50*b* create a restoring force which will act to displace rail 28 or spindle 44 relative to a linear bearing carriage 34 and radial bearing carriage 48 in a manner that will restore equal or nominal bearing gaps. As the bearing gaps are equalized, the magnitude of hydraulic resistance offered by each will return to the nominal value. This equilibrium condition is conveyed to dumbbell shuttle body 20, the pressure differential across dumbbell shuttle 14 ceases and dumbbell shuttle 14 shifts back to its equilibrium position.

Figure 6:
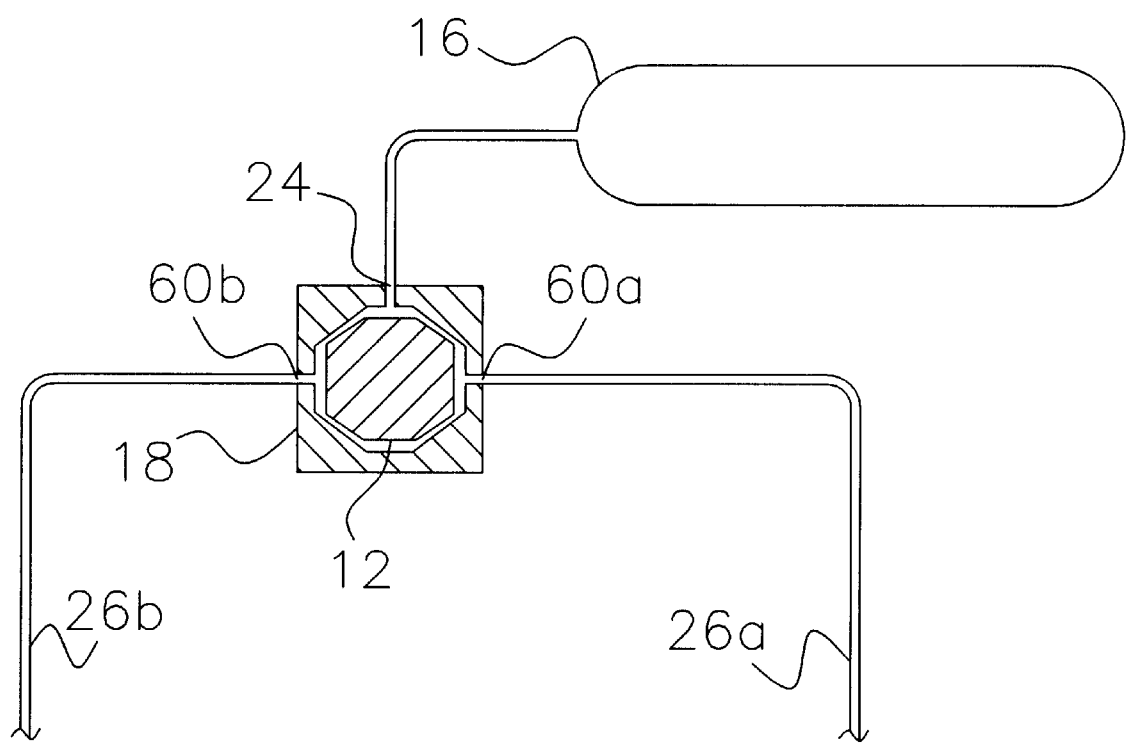
FIG. 6 is a section view of an alternative embodiment of the shuttle as a disc shuttle.

Description of Alternate Embodiment of Invention with a Disc Shuttle:

FIG. 6 is a section view of an alternative embodiment of a shuttle, such as a disc shuttle 12 in place of a ball shuttle 10 of the preferred embodiment. Disc shuttle 12 has two identical surfaces that are curved or conical, concentric and face away from each other. A shuttle body, such as a disc shuttle body 18 has an internal void to which outlet ports 60*a* and 60*b* are connected and hydraulic communications 26*a* and 26*b* are made. A disc shuttle 12 is located within the void. Disc shuttle 12 is sized to allow for movement within disc shuttle body 18. A fluid pressure source 16 is connected to an inlet port 24 in disc shuttle body 18. Inlet port 24 is ported to the internal void and located to establish parallel hydraulic flow paths between inlet port 24 to hydraulic communications 26*a* and 26*b*. Disc shuttle 12 is exposed to the divided fluid comprising the parallel flow paths. Disc shuttle 12 and the void in disc shuttle body 18 are of size and shape to create a hydraulic restriction in both of the parallel flow paths. The magnitude of the hydraulic resistance in each flow path is made increasingly higher as disc shuttle 12 moves toward the interior surface of the disc shuttle body 18 which bounds the respective flow path. Conversely, as disc shuttle 12 moves away from the interior surface of the disc shuttle body 18, which bounds the respective flow path, the hydraulic resistance is lowered.

Operation of Alternate Embodiment of Invention with a Disc Shuttle:

FIG. 6 is a section view of an alternative embodiment of the invention with a disc shuttle 12. Fluid from a pressurized fluid source 16 enters disc shuttle body 18 at inlet port 24 and envelops disc shuttle 12. The fluid flow divides in proportions relative to the hydraulic resistance between disc shuttle 12 and disc shuttle body 18 and is conveyed to the bearing pocket 36*a* and 36*b* or 50*a* and 50*b* via hydraulic communication 26*a* and 26*b*. Accordingly changes in the differential pressure of bearing pocket 36a and 36b or 50a and 50b is communicated across disc shuttle 12 which drives disc shuttle 12 in the direction of the flow path of lower pressure. This movement is accompanied by an increase in hydraulic resistance between disc shuttle 12 and disc shuttle body 18 in the flow path of lower pressure and a subsequent decrease in flow rate and pressure being delivered to a bearing pocket 36a or 36b or 50a or 50b of greater bearing gap. Simultaneously, the flow path of higher pressure within disc shuttle body 18 experiences a decrease in hydraulic resistance between disc shuttle 12 and disc shuttle body 18 giving rise to increased flow rate and delivery pressure a bearing pocket 36a or 36b or 50a and 50b of lesser bearing gap. The resultant rise in differential pressure between bearing pockets 36a and 36b or 50a and 50b create a restoring force which will act to displace rail 28 or spindle 44 relative to a bearing carriage 34 or 48 in a manner that will restore equal or nominal bearing gaps. As the bearing gaps are equalized, the magnitude of hydraulic resistance offered by each will return to the nominal value. This equilibrium condition is conveyed to disc shuttle body 18, the pressure differential across disc shuttle 12 ceases and disc shuttle 12 shifts back to its equilibrium position.

CONCLUSION, RAMIFICATIONS, AND SCOPE OF THE INVENTION

Accordingly, the reader will see that the Shuttle Compensated Hydrostatic Bearing can provide for nearly frictionless motion and high stiffness. The features of the invention allow for the shuttle body and shuttle to be remote from the bearing carriage which provides for less complex configurations at lower cost and higher serviceability.

Although the description above contains many specifications, these should not be construed as limiting the scope of the invention but as merely providing illustrations of some of the presently preferred embodiments of this invention. For example, the Shuttle Compensated Hydrostatic Bearing can provide for rotation, rotation about a point, rotation about an axis, translation or any combination of above motion. Bearing carriages can take on many shapes and configurations to include that of a truck design for use with a rail having a plurality of rail surfaces, which may not be parallel to each other. Bearing carriages can be located in many ways relative to each other. Any number of bearing carriages can be employed with a bearing guide, rail or spindle. A bearing carriage may employ one or more bearing pockets. Bearing pockets can have many shapes and depths. Bearing lands can have many shapes while bearing lands of a common assembly need not be parallel or concentric to each other. The number of rails in the machine assembly can vary from one to two or more. A rail can vary greatly in shape, dimension and proportion. A rail surface can be long or wide as in a plate. The shuttle and shuttle body can have many shapes and flow and pressure capacities. Various mediums can be employed as the operating fluid such as liquid, water, air or other. The components of the invention can be constructed of various materials and combinations of materials to include, but not be limited by, metal, plastic, or ceramic. The Shuttle Compensated Hydrostatic Bearing can function to provide a consistent bearing gap and low friction interface when used to create a balance with an opposing bearing or bearings, gravity, magnetic force, other or any combination of above. The appropriate pressure differential across a shuttle, during operation, can be created by a conjunctive pair of bearings or a bearing and fixed or variable hydraulic restriction in place of a bearing. Shuttle Compensated Hydrostatic Bearings can be employed in many types of applications including machinery in particular precision machinery.

Thus, the scope of the invention should be determined by the appended claims and their legal equivalents, rather than by the examples given.

I claim:

1. An apparatus for maintaining a consistent gas between movable bearing elements, suitable for use in machinery such as precision machine tools, comprising:
   a) means for dividing an inlet fluid flow from a pressurized source while regulating the pressure of the outlet fluid flows; and
   b) means for supplying the outlet fluid flow to a bearing gap such that a fluid film separates a spindle and a radial bearing carriage; and
   c) means for producing a restoring force with the fluid film which acts to return said spindle and said radial bearing carriage to a nominal separation when displaced by an applied load or force.

2. An apparatus for maintaining a consistent gap between movable bearing elements recited in claim 1, wherein said means for dividing an inlet fluid flow from a pressurized source while regulating the pressure of the outlet fluid flows includes:
   a) a shuttle body with an inlet port and a plurality of outlet ports; and
   b) said inlet port and said outlet ports connect to a void within said shuttle body; and
   c) a shuttle is contained within the void and creates hydraulic resistance in the flow paths between said inlet port and each said outlet port such that a change in the position of said shuttle is accompanied by a change in the hydraulic resistance in each flow path.

3. An apparatus for maintaining a consistent gap between movable bearing elements as recited in claim 2, includes:
   a) said shuttle is a ball shuttle and is substantially spherical; and
   b) said shuttle body is a ball shuttle body having an internal void and is substantially spherical and larger than said ball shuttle.

4. An apparatus for maintaining a consistent gap between movable bearing elements as recited in claim 2, includes:
   a) said shuttle is a disc shuttle having two identical and curved or conical surfaces that are concentric to each other and face away from each other; and
   b) said shuttle body is a disc shuttle body having an internal void of similar shape to said disc shuttle while slightly larger.

5. An apparatus for maintaining a consistent gap between movable bearing elements as recited in claim 2, includes:
   a) said shuttle is a dumbbell shuttle having two identical and curved or conical surfaces that are concentric to each other and face toward each other; and
   b) said shuttle body is a dumbbell shuttle body having an internal void of similar shape to said dumbbell shuttle while slightly larger.

6. An apparatus for maintaining a consistent gap between movable bearing elements as recited in claim 1, wherein said means for producing a restoring force with the fluid film which acts to return said spindle and said radial bearing carriage to a nominal separation when displaced by an applied load or force includes:
   a) means for varying the bearing gap as a relative load is applied to said radial bearing carriage or said spindle such that the fluid pressure in a radial bearing pocket is altered; and b) means for regulating the fluid pressure at the outlet port of a shuttle body such that a rise in differential pressure across a shuttle will alter the position of said shuttle causing the resulting hydraulic resistance between said shuttle and said shuttle body, outlet fluid pressure and said radial bearing pocket pressure to change in a manner which will tend to restore the bearing gap to a nominal size.

7. An apparatus for maintaining a consistent gap between movable bearing elements as recited in claim 6, wherein said means for varying the bearing gap as a relative load is applied to said radial bearing carriage or said spindle such that the fluid pressure in a radial bearing pocket is altered includes:
   a) said radial bearing pocket is supplied with pressurized fluid; and
   b) a bearing gap between said radial bearing carriage and said spindle provides a flow path from said radial bearing pocket thereby varying the fluid pressure within said radial bearing pocket according to the bearing gap.

8. An apparatus for maintaining a consistent gap between movable bearing elements as recited in claim 6, wherein said means for regulating the fluid pressure at the outlet port of said shuttle body such that a rise in differential pressure across said shuttle will alter the position of said shuttle causing the resulting hydraulic resistance between said shuttle and said shuttle body, outlet fluid pressure and said radial bearing pocket pressure to change in a manner which will tend to restore the bearing gap to a nominal size includes:
   a) said shuttle body with an inlet port and a plurality of outlet ports that hydraulically communicate with said radial bearing pockets; and
   b) said inlet port and said outlet ports connect to a void within said shuttle body; and
   c) said shuttle is contained within the void and creates hydraulic resistance in the flow paths between said inlet port and each said outlet port such that a change in the position of said shuttle is accompanied by a change in the hydraulic resistance in each flow path.

9. An apparatus for maintaining a consistent gap between movable bearing elements as recited in claim 1, wherein said means for supplying the outlet fluid flow to a bearing gap such that a fluid film separates a spindle and a radial bearing carriage includes:
   a) said radial bearing carriage having a radial bearing land; and
   b) a radial bearing pocket located in said radial bearing land whose length and width are contained within said radial bearing land; and
   c) a hydraulic communication capable of conveying fluid to said radial bearing pocket from a shuttle body; and
   d) said spindle having a spindle surface; and
   e) said radial bearing land is located adjacent to said spindle surface which creates a bearing gap.

10. A machine, such as a machine tool which comprises;
   a) an apparatus described by claim 1.

11. Apparatus in claim 1, in which;
   a) said radial bearing carriage has one or more radial bearing lands and one or more radial bearing pockets; and
   b) said spindle has one or more spindle surfaces which are substantially concentric to the bearing axis of rotation.

12. A method for maintaining a consistent gap between movable bearing elements, suitable for use in machinery such as precision machine tools, comprising the steps of:
   a) dividing an inlet fluid flow from a pressurized source while regulating the pressure of the outlet fluid flows; and
   b) supplying the outlet fluid flow to a bearing gap such that a fluid film separates a spindle and a radial bearing carriage; and
   c) producing a restoring force with the fluid film that acts to return said spindle and said radial bearing carriage to a nominal separation when displaced by an applied load or force.

13. A method for maintaining a consistent gap between movable bearing elements as recited in claim 12, wherein said steps of dividing an inlet fluid flow from a pressurized source while regulating the pressure of the outlet fluid flows includes:
   a) providing pressurized fluid to an inlet port of a shuttle body which has a plurality of outlet ports; and
   b) regulating the outlet fluid pressure or flow of the outlet fluid flow by allowing a shuttle to move within said shuttle body thereby creating varying hydraulic resistance in each flow path.

14. A method for maintaining a consistent gap between movable bearing elements as recited in claim 12, wherein said steps of supplying the outlet fluid flow to a bearing gap such that a fluid film separates said spindle and said radial bearing carriage includes:
   a) providing the outlet fluid flow to a radial bearing pocket adjacent to a bearing gap between said radial bearing carriage and said spindle.

15. A method for maintaining a consistent gap between movable bearing elements as recited in claim 12, wherein said steps of producing a restoring force with the fluid film which acts to return said spindle and said bearing carrier to a nominal separation when displaced by an applied load or force includes:
   a) creating a restoring force between said radial bearing carriage and said spindle as result of the differential pressure between bearing gaps.

16. An apparatus for maintaining a consistent gap between movable bearing elements, comprising:
   a) a shuttle body with an inlet port and a plurality of outlet ports; and
   b) said inlet port and said outlet ports connect to a void within said shuttle body; and
   c) a shuttle completely contained within said void, position of said shuttle being unrestrained by said shuttle body; and
   d) fluid supports said shuttle in said void, whereby the position of said shuttle being a result of hydraulic force applied by fluid; and
   e) said shuttle allows a fluid path from said inlet port to plurality of said outlet ports, said shuttle creates hydraulic resistance in the fluid paths between said inlet port and each said outlet port such that a change in the position of said shuffle is accompanied by a change in the hydraulic resistance in each flow path; and
   f) a radial bearing carriage having a radial bearing land; and
   g) a radial bearing pocket located in said radial bearing land whose length and width axe contained within said radial bearing land; and h) a hydraulic communication capable of conveying fluid to said radial bearing pocket from said shuttle body; and i) a spindle having a spindle surface; and j) said radial bearing land is located adjacent to said spindle surface and creates a bearing gap; and k) said bearing gap provides a flow path from said radial bearing pocket thereby varying the fluid pressure within said radial bearing pocket according to a bearing gap.

17. An apparatus for maintaining a consistent gap between movable bearing elements as recited in claim 16, wherein said radial bearing carriage having a radial bearing land includes:

a) said radial bearing pocket intersects said radial bearing land in an area; and b) said radial bearing land is substantially concentric to the bearing axis of rotation.

* * * * *